(12) United States Patent
Longis et al.

(10) Patent No.: US 10,203,165 B2
(45) Date of Patent: Feb. 12, 2019

(54) DEVICE AND METHOD FOR STORING THERMAL ENERGY

(71) Applicant: MULLER & CIE, Paris (FR)

(72) Inventors: Alexandre Longis, Paris (FR); François Pourrat, Paris (FR); Jean-Louis Morard, Paris (FR)

(73) Assignee: MULLER & CIE, Paris (FR)

( * ) Notice: Subject to any disclaimer, the term of this patent is extended or adjusted under 35 U.S.C. 154(b) by 210 days.

(21) Appl. No.: 15/328,053

(22) PCT Filed: Jul. 23, 2015

(86) PCT No.: PCT/EP2015/066950
§ 371 (c)(1),
(2) Date: Jan. 22, 2017

(87) PCT Pub. No.: WO2016/012573
PCT Pub. Date: Jan. 28, 2016

(65) Prior Publication Data
US 2017/0219294 A1    Aug. 3, 2017

(30) Foreign Application Priority Data

Jul. 23, 2014 (FR) ..................................... 14 57129
Mar. 2, 2015 (FR) ..................................... 15 51741

(51) Int. Cl.
*F24D 11/00*    (2006.01)
*F28D 20/00*    (2006.01)
(Continued)

(52) U.S. Cl.
CPC .............. *F28D 20/023* (2013.01); *C09K 5/06* (2013.01); *C09K 5/063* (2013.01); *F24F 5/0021* (2013.01);
(Continued)

(58) Field of Classification Search
CPC .. F28D 20/023; F28D 20/021; F28D 2220/10; F24F 5/0096; F24F 5/0021;
(Continued)

(56) References Cited

U.S. PATENT DOCUMENTS 3,532,856 A    10/1970  Collins
4,241,782 A    12/1980  Schoenfelder
(Continued)

FOREIGN PATENT DOCUMENTS

DE    19 28 694 A1    12/1969
DE    10 2012 108936 A1    8/2013
WO    2013/102676 A1    7/2013

*Primary Examiner* — Ljiljana Ciric
(74) *Attorney, Agent, or Firm* — Im IP Law; C. Andrew Im; Chai Im

(57) ABSTRACT

A device to store energy includes a phase change material (PCM), with a phase change temperature Tc, contained in a sealed container and constituting a storage core. A source to exchange heat with the PCM, at a temperature TA, to cause a phase change of the PCM. A recuperator to exchange heat with the PCM, at a temperature TB, to cause a phase change of the PCM in the opposite direction to the phase change produced by the source. A controller to control the heat flows between the PCM, the source and the recuperator. An apertured support in contact with the PCM in the sealed container and in thermal contact with the source and the recuperator.

30 Claims, 3 Drawing Sheets

1-1

(51) Int. Cl.
  *F28D 20/02* (2006.01)
  *F24H 7/02* (2006.01)
  *F24H 7/04* (2006.01)
  *F24H 9/20* (2006.01)
  *F24F 5/00* (2006.01)
  *C09K 5/06* (2006.01)
  *F28F 3/04* (2006.01)
  *F28F 21/08* (2006.01)

(52) U.S. Cl.
  CPC ......... *F24F 5/0096* (2013.01); *F24H 7/0216* (2013.01); *F24H 7/0416* (2013.01); *F24H 9/2078* (2013.01); *F28D 20/021* (2013.01); *F28F 3/048* (2013.01); *F28F 21/084* (2013.01); *F24D 2220/10* (2013.01); *Y02E 60/145* (2013.01); *Y02E 60/147* (2013.01)

(58) Field of Classification Search
  CPC .. C09K 5/06; C09K 5/063; F28F 3/048; F28F 21/084; F24H 9/2078; F24H 7/0416; F24H 7/0216; Y02E 60/145; Y02E 60/147
  See application file for complete search history.

(56) References Cited

U.S. PATENT DOCUMENTS

| | | | | |
|---|---|---|---|---|
| 4,250,866 | A * | 2/1981 | Telkes | F24H 3/025 110/101 C |
| 4,712,606 | A * | 12/1987 | Menelly | F24S 60/00 165/10 |
| 5,217,062 | A * | 6/1993 | Lindner | F28D 20/02 165/10 |
| 5,270,550 | A | 12/1993 | Martorana et al. | |
| 5,755,216 | A * | 5/1998 | Salyer | C04B 16/04 126/400 |
| 5,916,477 | A | 6/1999 | Kakiuchi et al. | |
| 2003/0152488 | A1* | 8/2003 | Tonkovich | B01F 5/0604 422/400 |
| 2012/0319410 | A1* | 12/2012 | Ambrosek | F02C 1/05 290/1 R |

* cited by examiner 1-1

DEVICE AND METHOD FOR STORING THERMAL ENERGY

RELATED APPLICATIONS

This application is a § 371 application from PCT/EP2015/066950 filed Jul. 23, 2015, which claims priority from French Patent Application No. 14 57129 filed Jul. 23, 2014 and French Patent Application No. 15 51741 filed Mar. 2, 2015, each of which is incorporated herein by reference in its entirety.

FIELD OF THE INVENTION

The invention relates to a device and a method for storing thermal energy. The invention is more particularly, but not exclusively, intended for an climatic apparatus or for a facility that uses apparatuses for controlling the climatic environment in a premises. The terms "climatic apparatus" denote any device for heating, air conditioning, mechanical ventilation or production of water at controlled temperature.

BACKGROUND OF THE INVENTION

Such climatic apparatuses consume energy, generally of electrical origin, which electrical energy is used directly to produce heat, for example by the passage thereof through an electric resistance heater, or by means of a heat engine such as a heat pump or a refrigeration unit for producing heat or cold. The invention is not limited to climatic apparatuses operated by means of electrical energy and also applies to any heat engine or climatic apparatus operated by means of combustion.

The energy demand emanating from climatic apparatuses is not uniform throughout the day, week or year. For example, in an urban area, peak periods are observed, when both offices and dwellings are occupied, for example at the end of a weekday day. The demand also changes with the seasons, with winter peaks in temperate countries, and summer peaks in hot countries. These consumption peaks alternate with off-peak periods, where the energy consumption is reduced. This lack of uniformity of the consumption is particularly tricky to manage when the energy consumption is electric and when it cannot be stored as such. The situation is more particularly tricky when the energy production uses uncontrolled intermittent production means, such as wind or solar means. Both the peak periods and off-peak periods pose a problem.

In a dwelling, the pricing system for the energy consumption tends to encourage consumption during off-peak hours and to discourage consumption during peak hours. Thus, in order to benefit from the best tariff but also in order to reduce the carbon footprint of said dwelling, it is useful to be able to store and restore the energy, particularly the energy consumed by the climatic apparatuses.

Heat storage techniques are known from the prior art and are based essentially on two principles, whether it is a question of storing cold or heat:
- sensible heat storage;
- latent heat storage.

Sensible heat storage consists in bringing a body, generally having a high thermal inertia, for example sand, to a high temperature, or conversely to low temperature in order to store cold, in an off-peak period, then in restoring this heat to the premises to be heated or to be cooled in a peak period, using a heat transfer fluid, for example by blowing into said premises air that has been in contact with the body in question and that is heated or cooled by this contact. Sensible heat storage makes it possible to store, in a body of mass m, of specific heat capacity Cp (constant with temperature), brought from an initial temperature $T_1$ to a temperature $T_2$, an amount of heat Hs equal to:

$$Hs = m \cdot Cp \cdot (T_2 - T_1)$$

Latent heat storage uses a material which, under the effect of heating or cooling, undergoes a phase transition, said phase transition taking place with the absorption, on heating, or the restoration, on cooling, of a latent heat of transition. The phase transitions most used for this purpose are the solid-liquid phase change, referred to as melting, crystallization or solidification phase change, the liquid-gas phase change, referred to as evaporation, liquefaction or else condensation phase change. Thus, taking the example of a melting phase change of a body of mass m, having a melting temperature $T_F$ such that $T_1 < T_F < T_2$, having a heat capacity $Cp^s$ in the solid state and $Cp^l$ in the liquid state and having a latent heat of transition L per unit of mass, when this body is heated from a temperature $T_1$ to a temperature $T_2$, the amount of energy HI stored is:

$$HI = m \cdot Cp^s \cdot (T_F - T_1) + m \cdot L + m \cdot Cp^l \cdot (T_2 - T_F)$$

For a same mass of material, the amount of energy stored is significantly greater, since the latent heat is generally high. For example, the latent heat of melting 1 kg of ice is equivalent to the energy needed to heat 1 kg of water from 0° C. to 80° C.

Since the phase transition is reversible, the amount of energy HI is restored during the cooling and the solidification of the body.

Thus, the storage of thermal energy in the latent heat of transition, by means of a material having a phase transition is, generally, much more effective than sensible heat storage. However, this thermodynamic principle encounters practical difficulties.

A first difficulty is linked to obtaining a uniform temperature in the body that is the subject of the phase transition. Indeed, the phase change materials (PCM) are not by themselves good heat conductors. Thus, when the heat transfer fluid intended to extract the latent heat therefrom, for example air, sweeps over the surface of the block, the thermal resistance that accumulates between the external exchange surface and the state change front rapidly becomes predominant and limits the thermal power.

One solution from the prior art for limiting this phenomenon consists in increasing the exchange surface by encapsulating the PCM so as to increase the specific exchange surface. This encapsulation is carried out in microbeads or in textile fibers. Besides the cost of these materials, this method from the prior art also has implementation drawbacks.

Thus, during the cooling of a solid-liquid transition PCM and on passing the melting temperature, whether this is for storing cold or for restoring heat stored in the liquid phase, a supercooling phenomenon occurs. This phenomenon is expressed by the fact that the solidification temperature is shifted toward low temperatures with respect to the melting temperature. Thus, the liquid phase does not solidify even for temperatures significantly below the melting temperature. Yet, the use of the latent heat of transformation means that the transformation and the change of state occur. Experimentation shows that the smaller the amount of PCM, the greater the supercooling. Thus, the solution from the prior art that consists in separating, by encapsulation, the PCM into small amounts is disadvantageous from the point of view of supercooling.

OBJECT AND SUMMARY OF THE INVENTION

The invention aims to solve the drawbacks of the prior art and for this purpose relates to an energy storage device comprising:

a. a load of a phase change material, referred to as PCM, the phase change temperature of which is Tc, and constituting a storage core;

b. a first means, referred to as a source, of heat exchange with the PCM, at a temperature TA, capable of causing a phase change of the PCM;

c. a second means, referred to as a recuperator, of heat exchange with the PCM, at a temperature TB, capable of causing a phase change of the PCM in the opposite direction to the phase change produced by the source;

d. means, referred to as control means, capable of controlling the heat flows between the PCM, the source and the recuperator;

e. a perforated medium, referred to as a support, in thermal contact with the PCM, the source and the recuperator.

Thus, the support makes it possible to homogenize the temperature in the PCM, without dividing the PCM into unit volumes that lead to an increase in the supercooling phenomenon.

The invention is advantageously carried out according to the embodiments and variants disclosed below, which should be considered individually or in any technically effective combination.

According to a first embodiment variant, suitable for storing heat, TA>Tc and TB<Tc.

According to a second embodiment variant, suitable for storing cold, TA<Tc and TB>Tc.

According to various embodiments, which are not mutually exclusive, the support comprises a metal foam, a block of metal wool, a grid, honeycomb, or a porous block. Used alone or in combination, these various elements make it possible to create, inside the leaktight container, a composite material formed by the PCM and the support, the overall thermal conductivity of which is improved relative to that of the PCM alone. The material constituting the support, irrespective of the embodiment, is chosen in particular as a function of the transition temperature Tc of the PCM.

According to one embodiment, the energy storage core is immersed in a heat transfer fluid. Thus, the block comprising the leaktight container loaded with PCM and the support constitutes a block for accumulating and restoring heat that does not require any electrical or fluidic connection in order to operate. A plurality of blocks is thus advantageously arranged in a heat transfer fluid by which the heat exchanges with the source and the recuperator take place. This embodiment makes possible a facility and an easier integration of a storage/recovery device, optionally in an existing facility.

According to another embodiment, the leaktight container and the support constitute a heat exchanger wherein the source and the recuperator are heat transfer fluids circulating in said plate exchanger. Unlike the previous embodiment, in this embodiment, the heat transfer fluid circulates in the container. This embodiment enables a faster heat exchange with the PCM. The type of exchanger is chosen as a function of the targeted performance and of the cost, but also as a function of the change in volume of the PCM between the high-temperature phase and the low-temperature phase. By way of nonlimiting example, the heat exchanger is a plate exchanger, a concentric spiral exchanger or a tubular exchanger, without these examples being limiting.

According to various variants, suitable as a function of the storing and restoring temperature, the PCM is chosen from: an aqueous solution, an alkane, a polyol or a salt. Aqueous solutions are more particularly indicated for cold storage, down to temperatures of the order of −35° C. Conversely, salts are more indicated for storage of energy at high temperature, above 200° C. Alkanes of paraffin wax type enable storage temperatures that stretch from −20° C. to +60° C. approximately, depending on the nature of the wax. Polyols, depending on their nature, offer a wide range of melting temperatures, from −50° C. to +130° C. approximately. In addition they offer a good resistance to the temperature and to the thermal cycling and have a low degree of supercooling.

Advantageously, the PCM of organic nature comprises a load of solid inorganic microparticles or nanoparticles. These particles make it possible to improve the apparent thermal conductivity of the PCM. By way of nonlimiting example, an addition, in an amount of less than 10% by weight, of hexagonal boron nitride particles, of carbon black or of carbon nanotubes makes it possible to improve the thermal conductivity of the PCM without notably degrading its capacities for storing energy in the latent heat of transition.

The invention also relates to a facility for heating or air conditioning a premises, which comprises an energy storage device according to any one of the preceding embodiments. Thus, said facility uses the energy heating device for storing energy during off-peak hours and for restoring this stored energy during peak hours.

According to one embodiment of the facility that is the subject of the invention, this facility comprises an energy storage device suitable for heat storage and an energy storage device for cold storage. Thus, said facility is suitable for limiting the negative effect of its consumption in peak hours irrespective of the season.

Advantageously, the energy storage device of the facility that is the subject of the invention is included in a climatic apparatus of said facility. Thus, a storing and restoring capacity, in particular for the elimination of peak hour consumptions, can be integrated into any existing facility by the installation of such a climatic apparatus in said facility.

According to one embodiment, the climatic apparatus is an electrical heating apparatus wherein the recuperator is a turbine capable of creating a scavenging air flow over the energy storage core. Since the temperature of the energy storage core changes in small proportions in the course of the operation of the climatic apparatus, between the melting temperature and the supercooling temperature of the PCM, this embodiment is particularly easy to regulate and, due to the high storage capacity of the core, the extraction and the storage of energy are capable of functioning simultaneously, so that the recuperator is also used as forced convection means outside of the restoring phases.

Advantageously, the Tc of the core of the climatic apparatus of the facility that is the subject of the invention is of the order of 120° C. and the PCM of said core comprises erythritol. This embodiment is particularly suitable for a convection heating mode.

Advantageously, the support of the thermal storage core of the climatic apparatus of the facility that is the subject of the invention is an aluminum foam, the degree of porosity of which is between 70% and 95% and preferentially is 90%.

Aluminum and its alloys possess a high thermal diffusivity and thus an ability to homogenize its own temperature and to exchange heat with the PCM in order to obtain a homogenization of the temperature in the thermal storage core. The high degree of porosity makes it possible to reduce the division of the PCM and thus to limit the effects of the support on the degree of supercooling. The metal foam is easily shaped and easily conforms to any shape of the leaktight container both for esthetic and technical reasons.

Advantageously, the climatic apparatus of the facility that is the subject of the invention comprises a radiant facade. Thus, said apparatus combines heating by convection and heating by radiation in order to improve the heating comfort. According to embodiment variants, the heating of the radiant facade is carried out by a separate heating circuit or by the same circuit as the one for storing and restoring the thermal energy.

The invention also relates to a method for the use of a facility according to the invention, which method comprises the steps consisting in:
   i. acquiring and interpreting a consumption setting;
   ii. if the interpretation of the consumption setting consists of a drop in the energy consumption of the facility, stopping the heat flow from the source to the PCM of the energy storage core;
   iii. if the interpretation of the consumption setting consists of an energy storage request, initiating the heat flow from the source to the PCM of the energy storage core.

Thus, the facility stores energy under favorable consumption conditions and reduces or stops the energy consumption under unfavorable consumption circumstances.

Advantageously, the method that is the subject of the invention comprises the steps consisting in:
   iv. acquiring and interpreting an operating setting;
   v. if the interpretation of the operating setting corresponds to a demand for energy diffusion and when the consumption setting consists of a drop in the energy consumption of the facility, initiating the heat exchange flow between the recuperator means and the PCM of the energy storage core.

Thus, even in an "unfavorable" consumption period, the method that is the subject of the invention takes advantage of the store of energy created in the energy storage core in order to provide occupant comfort in the premises without primary energy consumption.

According to exemplary embodiments that are not mutually exclusive:
   The consumption setting comprises a tariff signal emitted over the energy distribution network by the energy supplier. The signal consists for example of a peak hour signal emitted over the electrical network.
   The consumption setting comprises a load-shedding signal emanating from the internal circuit of the premises on which the facility acts. Thus, the consumption of the facility, irrespective of the tariff conditions, is maintained within predefined limits.
   The consumption setting comprises a multitude of information, in particular meteorological information, originating from a telematic network connected to the facility. The use of a telematic network, for example the Internet, makes it possible to exchange, with the facility that is the subject of the invention, complex data including projections on the consumption, information on the energy mix used, or else information on the price of greenhouse gas emission permits, without this list being exhaustive.

According to embodiment variants, the interpretation of the consumption setting is carried out by the facility itself, for example in the control means of the energy storage device, or this interpretation is carried out remotely, for example by the energy supplier, and transmitted to the facility.

According to exemplary embodiments that are not mutually exhaustive:
   The operating setting comprises a signal originating from a thermostat.
   The operating setting comprises a signal originating from a premises occupancy detector.
   The operating setting comprises a signal resulting from a facility programming means.

BRIEF DESCRIPTION OF THE DRAWINGS

The invention is disclosed below according to its preferred embodiments, which are in no way limiting, and with reference to FIGS. 1 to 7, in which.

DETAILED DESCRIPTION OF THE EMBODIMENTS

Figure 1:
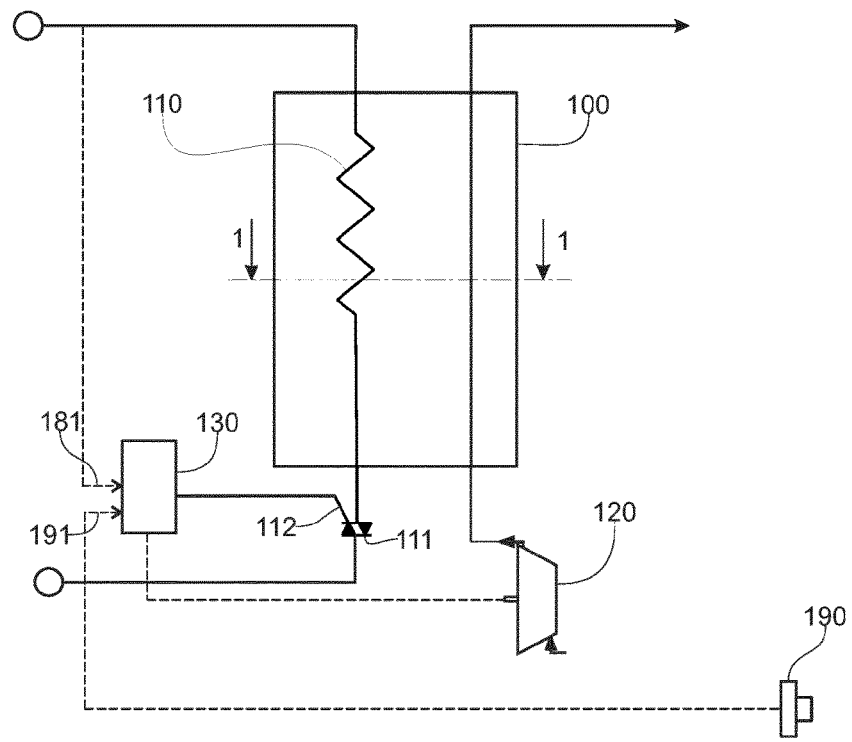
FIG. 1 is a schematic view of an example of a facility according to the invention.

FIG. 1, according to one schematic implementation and embodiment example of the device that is the subject of the invention, this device comprises a source (110), such as an electric resistance heater, which resistance heater is connected to the electrical network and the operation of which is, for example, controlled by means of a TRIAC (111), the trigger gate (112) of which is controlled by a control device (130). Said control device (130) comprises, according to one exemplary embodiment, computational and memory means, an output interface and an input interface. The trigger gate (112) of the TRIAC (111) is connected to the output interface. According to this exemplary embodiment, the resistance heater (110), when it is supplied with electrical current, heats an energy storage core included in a thermally insulating chamber (100). A turbine (120) makes it possible to blow air into said chamber, so that the air is heated in contact with the energy storage core before being sent toward the premises to be heated. Said turbine is also controlled by the control device. According to an alternative embodiment, the source consists of a heat transfer fluid, for example a mineral oil or water heated in a boiler or by a heat pump, the circulation of said fluid being, for example, controlled by means of a solenoid valve controlled by the control device (130). Although the invention is presented here in the case of a heating device, according to another embodiment, the source consists of a heat transfer fluid cooled by a refrigeration block, which thus makes it possible to form an air-conditioning system. According to one particular embodiment, a heating/air conditioning facility comprises two storage devices, one intended for heat storage, the other intended for cold storage. The control device (130) receives at its input interface a consumption setting (181), this consumption setting is, by way of example, a peak hour signal, sent by the electricity supplier by carrier signal over the network. Said control device (130) also receives at its input interface, according to this exemplary embodiment, an operating setting (191), said operating setting emanating from a sensor or several sensors placed in the premises subjected to the heating or air conditioning, said sensors delivering one or more settings relating to the comfort or occupancy conditions of said premises. As nonlimiting examples, the sensor (190) is a thermometer, an occupancy detector, a hygrometer, a window-open detector or any combination of these sensors. According to the combination of consumption and operating information (181, 191) received by the control device, the latter defines an operating mode in terms of heating power delivered to the resistance heater (110) or of air flow rate sent to the premises by the turbine (120). This operating mode comprises three essential operating principles:

According to a first operating principle, the source (110) discharges into the energy storage core, this operating mode corresponds to pure storage. This case corresponds to the conditions in which the consumption setting (181) is favorable, for example an off-peak hour, and when the operating setting (191) indicates that it is not useful to modify the climatic conditions in the premises.

According to a second operating principle, the source (110) discharges nothing, and the recuperator, for example the turbine (120) operates giving rise to a heat exchange with the storage core, this operating mode corresponds to a pure restoration of the stored energy and takes place when the consumption setting (181) is unfavorable, for example as peak hour, and when the operating setting (191) entails a climatic action (heating, air conditioning) in the premises.

According to a third operating principle, the source (110) and the recuperator (120) operate together, this being according to two variants:

according to a first variant, the energy introduced by the source (110) is fully recovered and transferred to the premises by the recuperator (120);

according to a second variant, the energy introduced by the source (110) is greater than the energy extracted by the recuperator (120) and there is storage of energy in the energy storage core.

Advantageously, these operating modes alternate over time so as to obtain optimum regulation and optimum consumption as a function of the characteristics of the system.

Figure 2:
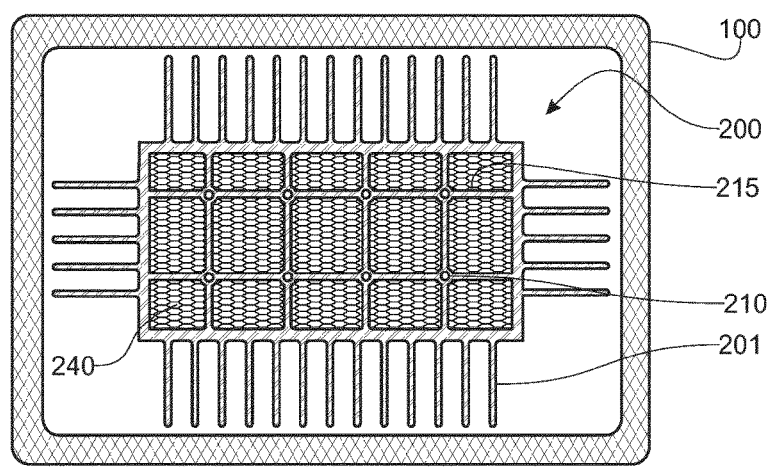
FIG. 2 shows, as a cross-sectional view of the cross section 1-1 defined in FIG. 1, an exemplary embodiment of an energy storage core of a device according to the invention.

FIG. 2, the energy storage core (200) comprises a container. According to this illustrative exemplary embodiment, said container is represented as a molded part, a person skilled in the art adapts other embodiments, in particular by assembling or machining. According to this exemplary embodiment, the air blown by the turbine thermally exchanges with said core (200), by coming into contact with the outer walls of this core. For this purpose, said core advantageously consists of a thermally conductive material, such as an aluminum alloy, and comprises means (210), such as fins, for promoting the heat exchange and the convection effects. According to this exemplary embodiment, the inside of the energy storage core (200) is compartmentalized by fins (215) at the intersection of which channels (210) extend, said channels each receiving, according to this embodiment, a shielded resistance heater (not represented). Thus, according to this exemplary embodiment, the energy storage core (200) is heated from the inside, by means of said resistance heaters, and cooled from the outside by circulation of air. According to one alternative embodiment, half of the channels (215), i.e. one channel in two, is used for the circulation of a heat transfer fluid that acts as a recuperator, and the other half of said channels (215) is used for the circulation of a heat transfer fluid that acts as a source or for the passage of a shielded resistance heater. Any proportion or any combination of these technical solutions is obviously possible without departing from the invention. According to yet another embodiment, since the support used is an aluminum foam, this foam is used as the heating resistor, directly in contact with the PCM. In this case, the container of the storage core consists of an electrically insulating material or is lined inside with a layer of an electrically insulating material, for example a polymer or a ceramic that withstands the melting temperature of the PCM. When the storing and restoring heat exchanges are carried out inside the core, the leaktight container thereof advantageously consists of a thermally insulating material, such as a ceramic, or the container is thermally insulated by any appropriate means.

According to this exemplary embodiment, the cells (240) delimited by the internal fins (215) are filled with a composite material comprising a PCM and a perforated support. As nonlimiting examples, said support consists of a sponge of metal wool such as an aluminum or copper wool, a metal foam such as an aluminum or magnesium foam, a metal fabric or carbon fiber fabric, a honeycomb block made of aluminum or of carbon machined to the shape of the cell, or else a porous graphite block. The objective of such a support is to promote the homogenization of the temperature in the PCM, and also the conduction of heat between the PCM and the source or the recuperator. The nature of the PCM and the nature of the support are chosen as a function of the targeted application and, consequently, as a function of the phase transition temperature of the PCM used. The amount by volume of support relative to the PCM is at least equal to 5% and less than 30%, preferably of the order of 10%. The degree of filling of the cells by the PCM takes into account the possible variation in volume thereof during the phase transition. All the phase transitions having a latent heat of transformation can be used for the purposes of carrying out the invention, however the solid-liquid transformation is the one that has the greatest ease of use and offers high latent heats of transformation.

Figure 3:
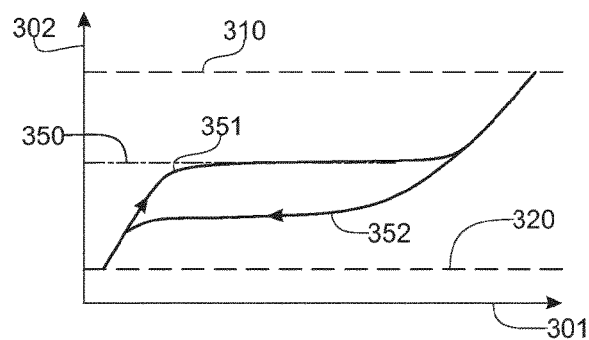
FIG. 3 illustrates the change in the temperature of a PCM when it is subjected to heating or cooling.

FIG. 3, according to one theoretical schematic example, in a graph of time (301), temperature (302), change (351, 352) in the temperature of a PCM when it is subjected to heating according to a temperature setting (310) above its melting temperature (350), then to a cooling according to a temperature setting (320) below its melting temperature, reveals a temperature hold corresponding, on heating (351), to the melting temperature and, on cooling (352), to a temperature slightly below the melting temperature (350). This temperature hold reflects the latent heat of transformation: on heating. Thus, during the melting, the material absorbs heat without its temperature increasing and, on cooling, during the solidification, the PCM gives up heat without its temperature decreasing. The temperature difference between the hold observed on heating (351) and the hold observed on cooling (352) corresponds to supercooling. Thus, in order to benefit from this phenomenon in terms of heat storing and restoring, it is preferable, when the device is in nominal operation, to regulate around the melting temperature of the PCM. Thus, for a use in heating by convection, a PCM having a melting temperature between 80° C. and 150° C. is advantageous. By way of example, erythritol ($C_4H_{10}O_4$) has a melting temperature of the order of 120° C. at atmospheric pressure, very suitable for this use and a relatively high boiling temperature, of the order of 330° C. which limits the risks in the event of overheating, the product moreover not being flammable. Furthermore it is hygroscopic. Other polyols, having similar properties, can be used within this temperature range, for example xylitol ($C_5H_{12}O_5$), the melting temperature of which is of the order of 95° C., mannitol ($C_6H_{14}O_6$), the melting temperature of which is of the order of 165° C., or else dulcitol (galactitol), the melting temperature of which is of the order of 190° C.

According to one embodiment, hexagonal boron nitride or carbon black nanoparticles are added to the PCM in a weight proportion of less than 5% in order to improve the apparent thermal conductivity thereof.

Figure 4:
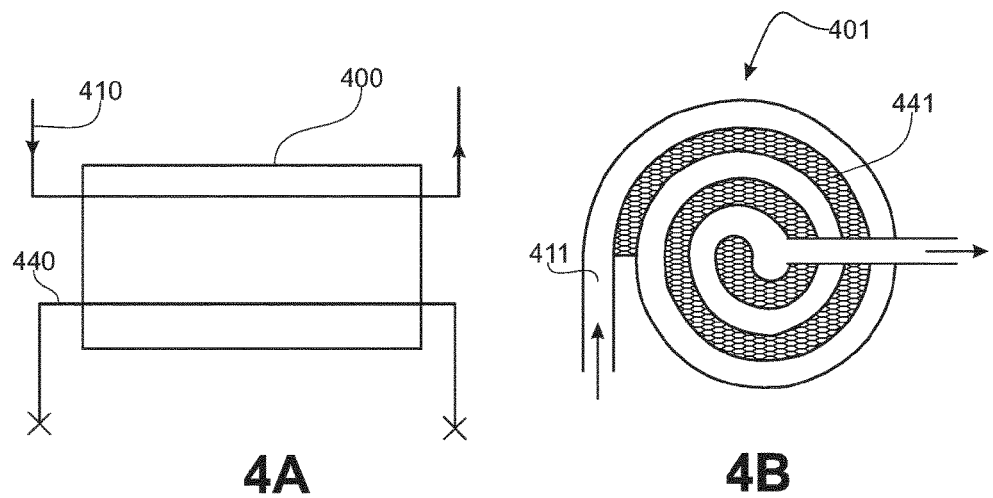
FIG. 4 schematically represents two particular exemplary embodiments of the device that is the subject of the invention using a heat exchanger, FIG. 4A according to a schematic diagram, FIG. 4B according to a spiral coaxial embodiment, as a cross-sectional view.

FIG. 4A, according to one exemplary embodiment, the thermal storage core forms a walled heat exchanger (400). A walled heat exchanger comprises two fluid circulation circuits, separated by thin walls so as to maximize the thermal exchange surface between the fluids circulating in the two circuits without said fluids coming into contact with one another. The most common walled heat exchangers are plate exchangers and tubular exchangers. In the case of the invention, one of the circuits of the exchanger (400) is used to circulate a heat transfer fluid (410). The other circuit (440) of the exchanger is filled with a PCM, with no circulation thereof. The walls of the exchanger, when the distance between said walls is small, act as support with respect to the PCM. According to one exemplary embodiment corresponding to this embodiment, the heat transfer fluid, for example water, is firstly heated by a source (not represented) optionally through another heat exchanger, then passes through the heat exchanger (400) comprising the PCM in one of its circuits, before being sent to a climatic apparatus (not represented) such as a forced air heater, then returns to the source thus following a closed circuit. In the energy storage phase, for example in off-peak time with absence of heating of the premises, the ventilation of the forced air heater is cut, and the heat transfer fluid gives most of its energy to the PCM. If the heat transfer fluid is water, the melting temperature of said PCM is chosen to be less than 100° C., for example 60° C. or 50° C. or a lower temperature, of the order of 35° C. if the source is a heat pump using geothermal energy in order to increase the energy efficiency of the system. A polyol or a paraffin wax are suitable as PCM in this case. In the pure restoring phase, the energy production of the source is stopped while the ventilation of the forced air heater is started. The circulation of the heat transfer fluid in the exchanger (400) leads to the solidification of the PCM and the extraction of the latent heat. Thus, the same heat transfer fluid circuit carries out the storing and the restoring of the energy.

FIG. 4B, according to another exemplary embodiment, the walled heat exchanger (401) used is of spiral coaxial type. This type of exchanger comprises two spiral coaxial circuits (411, 441), nested one inside the other, as FIG. 4B schematically represents. One of the circuits (411) is used for the circulation of the heat transfer fluid (411), and the other circuit (441) is filled by the PCM combined, where appropriate, with a support of metal wool or foam type, which are easily inserted into this type of exchanger. The operation is identical to that described for the embodiment from FIG. 4A. The advantage of the coaxial spiral exchanger is that it is relatively insensitive to the variation in volume of the PCM during the melting or solidification thereof. A variation in volume of said PCM results in a simple elastic radial expansion of the exchanger. Thus, this embodiment makes it possible to use PCMs that have significant volume variations between the two phases, in particular aqueous solutions for storing cold.

Figure 5:
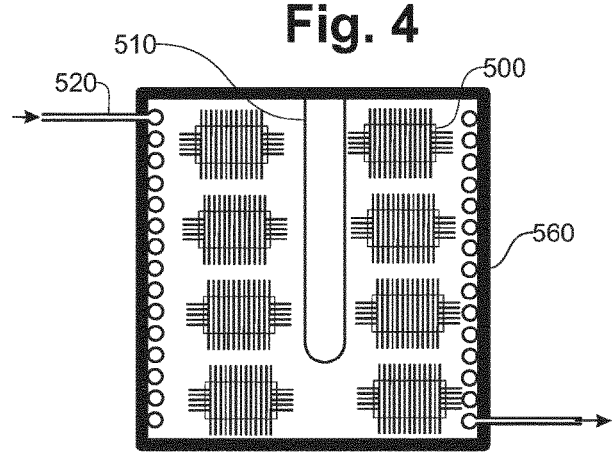
FIG. 5 illustrates a cross-sectional view showing the principle of an exemplary embodiment of the device that is the subject of the invention that uses a plurality of storage cores in a fluid bath.

FIG. 5, according to another exemplary embodiment of the device that is the subject of the invention, no fluid and no heating means pass through the storage core (500). Said core consists of a leaktight container filled with a PCM and a support as described above. According to one exemplary embodiment, a plurality of cores (500) of this type is placed in a tank (560) filled with a fluid such as mineral oil. Alternatively, the tank is a water heater filled with domestic hot water. According to one exemplary embodiment, an immersion heater (510) constitutes the source. A heat transfer fluid circuit (520) running through the tank (560) for example in the form of a coil, constitutes the recuperator. If the tank (560) is a water heater, the recuperator is formed by the domestic hot water circuit. In this case the source is either the immersion heater (510) in the case of an electric water heater, or the heat transfer fluid circuit (520) in the case of a thermodynamic water heater, or even both. In a favorable consumption period, the fluid contained in the tank is heated, for example by the immersion heater, and the energy is stored in the storage cores (500). These cores restore this heat to the fluid contained in the tank when said fluid is no longer heated and when its temperature drops below the supercooling temperature of the PCM contained in said cores (500). If the tank is a water heater, the melting temperature of the PCM used is chosen between 50° C. and 60° C.

Figure 6:
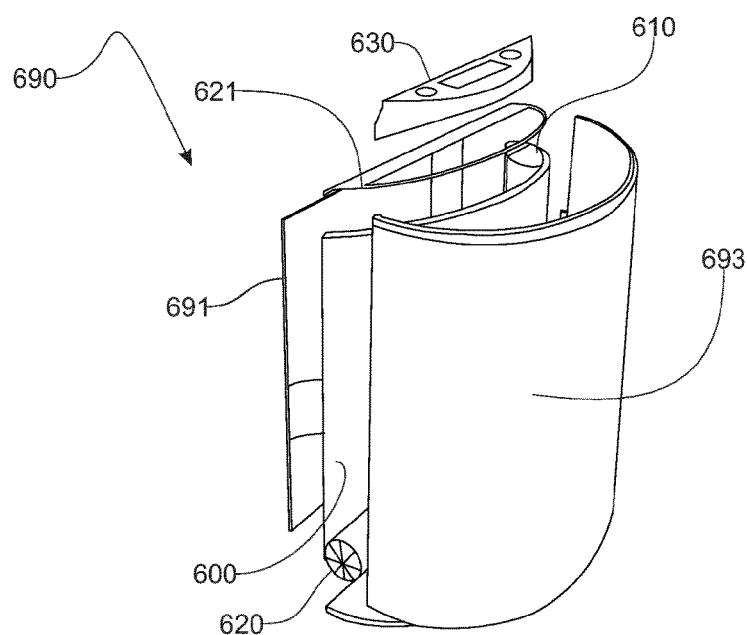
FIG. 6 represents, as a perspective and exploded view, an exemplary embodiment of a climatic apparatus comprising an energy storage core.

FIG. 6, according to one exemplary embodiment, the facility that is the subject of the invention, comprises an climatic apparatus (690) provided with an energy storage core (600). According to one exemplary embodiment, said apparatus is an electric heating apparatus and comprises a frame, the rear face (691) of which is capable of being fastened to a partition in the premises to be heated. Said frame also supports a radiant element (693) forming the facade of the apparatus.

According to one exemplary embodiment, the internal working volume of the storage core (600) is of the order of 40 $dm^3$, and is entirely filled with aluminum foam and a PCM. Said core (600) is easily shaped to the esthetics of the apparatus. Said core (600) comprises a source (610) in the form of an electric resistance heater and a recuperator (620) in the form of a turbine. A movable flap (621) also makes it possible to regulate the convective flow.

The radiant facade (693) for example consists of glass. It is in contact with or in the immediate vicinity of the core (600) so that this core transmits its heat thereto by conduction and by radiation. Thus, the heat produced by the source (610) or restored from the core (600) is distributed between radiation and convection.

Advantageously, the apparatus comprises an air filter, for example of HEPA (High Efficiency Particulate Air) type that makes it possible to filter the air from the turbine (620).

The apparatus also comprises a control device (630) equipped with a control keyboard and a control screen making it possible to control a set of intelligent functions such as occupancy detection, window-open detection, self-programming of operating parameters. Said control device is furthermore connected by a pilot wire or by wireless network to a central control unit of the facility of which it is part, or comprises means for detecting signals comprising a consumption setting over the electrical network.

Figure 7:
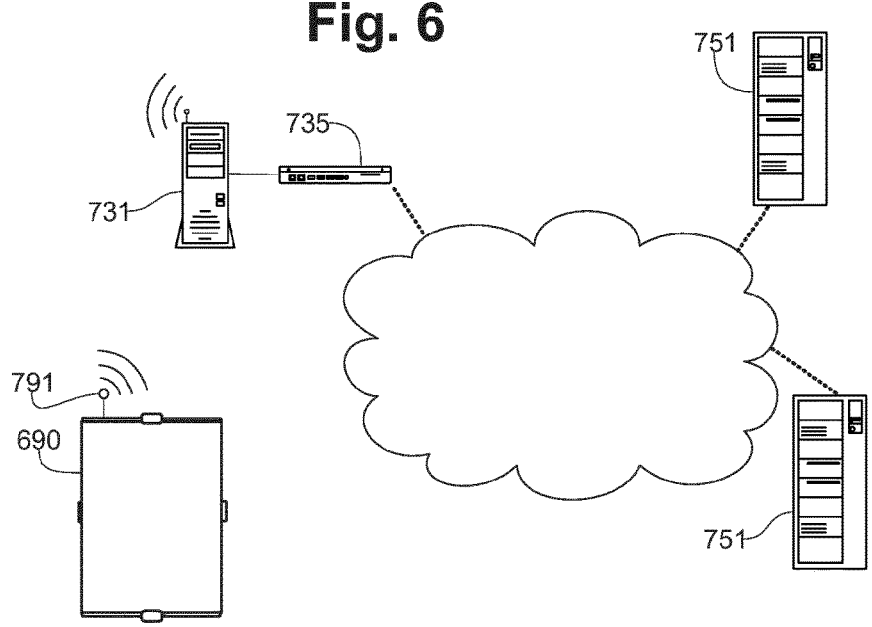
FIG. 7 is a schematic diagram of the control environment of the apparatus from FIG. 6.

FIG. 7, according to one exemplary embodiment, the heating or air conditioning facility that is the subject of the invention comprises a microserver (731) to which the apparatus (690) comprising energy storing and restoring capacities is connected by a local, in particular wireless, network of WLAN type, or a personal network of WPAN type. According to one exemplary embodiment, this link to the network is carried out by a transceiver (791) according to WiFi® protocol, the connection means being powered by the electrical power supply of the apparatus (690). The microserver (731) is connected to the local network and to the Internet via a router (735). Alternatively, the router (735) and the microserver (730) are the same apparatus. According to another embodiment, the microserver is included in the climatic apparatus (690). Thus, the installation of this apparatus (690) in an existing facility makes it possible to fundamentally modify the energy performance thereof. The microserver (731) is capable of sending data and of communicating, by the Internet network, with one or more "regulatory authority" servers (751). According to one exemplary embodiment, the regulatory authority (751) communicates to the microserver the plan for peak hour elimination that is envisaged. This elimination plan takes into account, for example, meteorology, the projection of the peak hours and the projection of energy production by renewable energies. The microserver (731) communicates its information or a consumption program deduced from this information, to the climatic apparatus (690) which, via its computer, deduces therefrom the storing and restoring cycles for the following hours or days.

The description above and the exemplary embodiments show that the invention achieves the targeted objective, namely that the energy storage device that is the subject of the invention constitutes a decentralized energy storage site that can be deployed over all existing housing stock, down to a domestic level, and thus contributes to effectively smoothing out peaks of electricity consumption.

The invention claimed is:

1. An energy storage device comprising:
    a load of a phase change material (PCM), with a phase change temperature Tc, contained in a leaktight container and constituting an energy storage core;
    a source to exchange heat with the PCM, at a temperature TA, to cause a phase change of the PCM;
    a recuperator to exchange heat with the PCM, at a temperature TB, to cause a phase change of the PCM in an opposite direction to the phase change produced by the source;
    a controller to control heat flows between the PCM, the source and the recuperator; and
    a perforated support, in contact with the PCM in the leaktight container and in a thermal contact with the source and the recuperator.

2. The energy storage device as claimed in claim 1, wherein TA>Tc and TB<Tc.

3. The energy storage device as claimed in claim 1, wherein TA<Tc and TB>Tc.

4. The energy storage device as claimed in claim 1, wherein the perforated support comprises a metal foam.

5. The energy storage device as claimed in claim 1, wherein the perforated support comprises a block of metal wool.

6. The energy storage device as claimed in claim 1, wherein the perforated support comprises a grid.

7. The energy storage device as claimed in claim 5, wherein the perforated support comprises a honeycomb.

8. The energy storage device as claimed in claim 1, wherein the perforated support comprises a porous block.

9. The energy storage device as claimed in claim 1, wherein the energy storage core is immersed in a heat transfer fluid.

10. The energy storage device as claimed in claim 1, wherein the leaktight container and the perforated support constitute a heat exchanger; and wherein the source and the recuperator are heat transfer fluids circulating in said heat exchanger.

11. The energy storage device as claimed in claim 1, wherein the PCM is an aqueous solution.

12. The energy storage device as claimed in claim 1, wherein the PCM is a polyol.

13. The energy storage device as claimed in claim 12, wherein the PCM comprises a load of solid inorganic microparticles or nanoparticles.

14. The energy storage device as claimed in claim 1, wherein the PCM is an alkane.

15. The energy storage device as claimed in claim 1, wherein the PCM is a salt.

16. A facility to heat or air condition a premises, further comprising the energy storage device as claimed in claim 1.

17. The facility as claimed in claim 16, further comprising two energy storage devices, the first energy storage device for heat storage with TA>Tc and TB<Tc, and the second energy storage device for cold storage with TA<Tc and TB>Tc.

18. The facility as claimed in claim 16, wherein the energy storage device is included in a climatic apparatus of the facility.

19. The facility as claimed in claim 18, wherein the climatic apparatus is an electrical heating apparatus wherein the recuperator is a turbine to generate a scavenging air flow over the energy storage core.

20. The facility as claimed in claim 19, wherein Tc of the energy storage core of the climatic apparatus is 120° C. and wherein the PCM of the energy storage core comprises erythritol.

21. The facility as claimed in claim 19, wherein the perforated support of the energy storage core of the climatic apparatus is an aluminum foam with a degree of porosity between 70% and 95%.

22. The facility as claimed in claim 19, wherein the climatic apparatus comprises a radiant facade.

23. A method for operating the facility as claimed in claim 16, comprising the steps of:
    acquiring and interpreting a consumption setting;
    stopping a heat flow from the source to the PCM of the energy storage core in response to a determination of a drop in an energy consumption of the facility based on an interpretation of the consumption setting; and
    initiating the heat flow from the source to the PCM of the energy storage core in response to a determination of an energy storage request based on the interpretation of the consumption setting.

24. The method as claimed in claim 23, further comprising steps:
    acquiring and interpreting an operating setting; and
    initiating a heat exchange flow between the recuperator and the PCM of the energy storage core in response to a determination of a demand for energy diffusion based on an interpretation of the operating setting and in response to the determination of a drop in the energy consumption of the facility based on the interpretation of the consumption setting.

25. The method as claimed in claim 24, wherein the operating setting comprises a signal originating from a thermostat.

26. The method as claimed in claim 24, wherein the operating setting comprises a signal originating from a premises occupancy detector.

27. The method as claimed in claim 24, wherein the operating setting comprises a signal resulting from a microserver.

28. The method as claimed in claim 23, wherein the consumption setting comprises a tariff signal emitted over an energy distribution network by an energy supplier.

29. The method as claimed in claim 23, wherein the consumption setting comprises a load-shedding signal emanating from an internal circuit of the premises on which the facility acts.

30. The method as claimed in claim 23, wherein the consumption setting comprises a multitude of information, including meteorological information, originating from a telematic network connected to the facility.

* * * * *